United States Patent [19]

Aishima et al.

[11] 3,989,878

[45] Nov. 2, 1976

[54] CATALYST AND PROCESS OF PRODUCTION OF POLYETHYLENE

[75] Inventors: Itsuho Aishima, Fujisawashi; Hisaya Sakurai, Kurashikishi; Yukichi Takashi, Kurashikishi; Hideo Morita, Kurashikishi; Tadashi Ikegami, Kurashikishi; Toshio Sato, Kurashikishi, all of Japan

[73] Assignee: Asahi Kasei Kogyo Kabushiki Kaisha, Osaka, Japan

[22] Filed: May 21, 1975

[21] Appl. No.: 579,752

[30] Foreign Application Priority Data
May 25, 1974 Japan.............................. 49-58377
Feb. 24, 1975 Japan.............................. 50-21876

[52] U.S. Cl. ........................... 526/116; 252/429 B; 252/429 C; 252/431 R; 526/119; 526/122; 526/127; 526/128; 526/132; 526/144; 526/151; 526/165; 526/352
[51] Int. Cl.²...................... C08F 4/66; C08F 10/02
[58] Field of Search ........ 252/429 B, 429 C, 431 R; 260/88.2, 94.9 C, 94.9 E; 526/116, 122, 127, 128, 132, 144, 148, 165, 151

[56] References Cited
UNITED STATES PATENTS 3,737,393  6/1973  de Vries............................ 260/94.9 E
3,755,274  8/1973  Piekarski et al. ................ 260/94.9 C
3,907,759  9/1975  Okada et al..................... 260/94.9 C

FOREIGN PATENTS OR APPLICATIONS 2,209,874  10/1972  Germany

*Primary Examiner*—Edward J. Smith
*Attorney, Agent, or Firm*—Burgess, Dinklage & Sprung

[57]  ABSTRACT

A process for polymerizing ethylene or a mixture of ethylene and another olefin is proposed in which the polymerization can be carried out with an extremely high efficiency by using a catalyst prepared by reacting (A) a hydrocarbon-insoluble reaction product (obtained by reacting (i) a specified organomagnesium-containing hydrocarbon-soluble complex, or reaction product of (i), with (ii) a specified siloxane compound and with (iii) at least one kind of titanium or vanadium compound containing at least one halogen atom), with (B) a specified organoaluminum compound. Resultant polymers have a high molecular weight and a high rigidity and molecular weight and molecular weight distribution thereof can be easily controlled.

15 Claims, No Drawings

CATALYST AND PROCESS OF PRODUCTION OF POLYETHYLENE

DESCRIPTION OF THE INVENTION

This invention relates to processes for polymerizing ethylene or a mixture of ethylene and another olefin. More particularly, it relates to a novel process for low-pressure polymerization of ethylene by means of a catalyst prepared from a novel compound of an organo-zinc-(or boron-)magnesium complex compound.

A process for low-pressure polymerization of ethylene in the presence of a catalyst consisting of an organomagnesium compound or organozinc compound and a transition metal compound has been disclosed in the specification of the patent issued to K. Ziegler (Japanese Patent Publication No. 1546/1957). However, since an organomagnesium compound itself is insoluble in the inert hydrocarbon medium employed both in the synthesis of catalyst and in the polymerization reaction, it cannot be effectively used. It has not been possible to realize a high activity with this catalyst. It is also well known to persons skilled in the art in this field that an organozinc compound is soluble in the above medium and reacts with a transition metal compound to form a catalyst, but the performance thereof as a catalyst is extremely poor and an organoboron compound does not form an effective catalyst.

As catalysts which are capable of being effectively used and whose activities are elevated by use in a specific form, there are known for example an organomagnesium halide, that is, a complex made from a Grignard's reagent and an ether, and a system derived from an organomagnesium alkoxide or a system derived from dialkylmagnesium and aluminum halide (West German Laid Open Patent Specification Nos. 2024558 and 2116045 and Dutch Patent No. 7103232). These catalysts have considerably high activity per transition metal but have the disadvantage that there is residual halogen in the polymer and thus the catalyst removal step cannot completely be omitted from the polyethylene manufacturing process.

We continued intensive studies of catalysts derived from an organomagnesium compounds. As a result, we have found that an organo-zinc-(or boron-) magnesium complex, which is soluble in an inert hydrocarbon medium, can be produced by reacting a specific organomagnesium compound and an organo-zinc-(or boron) compound under a specified condition; and a highly active catalyst can be obtained by reacting the above complex and a titanium or vanadium compound and then combining the resultant specific solid component with an organo-aluminum compound.

This invention resides in a process which, briefly stated, comprises polymerizing ethylene or a mixture of ethylene and another olefin in the presence of a catalyst prepared by reacting (A) a hydrocarbon-insoluble reaction product formed by the reaction of (i) an organomagnesium-containing hydrocarbon-soluble complex represented by the general formula $M_\alpha Mg_\beta X_p Y_q R^1_r R^2_s$ (wherein M is a zinc or boron atom, $R^1$ and $R^2$ are hydrogen or the same or different hydrocarbon radicals, each having 1 – 10 carbon atoms, X and Y are the same or different groups $OR^3$ or $OSiR^4R^5R^6$, $R^3$ is a hydrocarbon radical having 1 – 10 carbon atoms, $R^4$, $R^5$ and $R^6$ are hydrogen or the same or different hydrocarbon radicals, each having 1 – 10 carbon atoms, $\alpha$ and $\beta$ each is at least 1, and $\beta/\alpha$ is 1 – 10, $p$, $q$, $r$ and $s$ are each 0 or greater than 0 and $p + q + r + s = m\alpha + 2\beta$, and $(p+q)/(\alpha+\beta) \leq 0.80$ and $m$ is the valence of M), or a reaction product of (1) with (ii) a linear or cyclic siloxane compound having a constitutional unit represented by the general formula

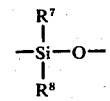

(wherein $R^7$ and $R^8$ are hydrogen or the same or different hydrocarbon radicals each having 1 – 10 carbon atoms) and with (iii) at least one titanium or vanadium compound containing 1 – 4 halogen atoms; and (B) an organoaluminum compound having the general formula $AlR^9_n Z_{3-n}$ (wherein $R^9$ is a hydrocarbon radical having 1 – 20 carbon atoms, Z is a member selected from the group consisting of hydrogen, halogen, alkoxy, aryloxy and siloxy radicals and $n$ is a number from 2 – 3).

As mentioned above, this invention provides a process for polymerizing ethylene in the presence of a novel catalyst which utilizes a special organo-zinc-(or boron-)magnesium complex as one component.

This invention has some distinguishing features. First, an extremely high catalytic efficiency can be achieved. As described later in the examples, the catalyst efficiency obtained amounts to 30,000 grams of polyethylene per gram of solid component per hour per Kg/cm² of ethylene. This allows complete elimination of the catalyst removal step. As compared therewith, the catalysts according to the above patent applications (West German Laid Open Patent Specification Nos. 2024558 and 2116045 and Dutch Patent Specification 7103232) provide as low a catalytic efficiency as 10,000 or less. This clearly proves the superiority of the catalyst according to the present invention. Secondly, polymers having higher molecular weight and higher rigidity can be obtained and easy control of molecular weight and molecular weight distribution can be attained through the modification of catalyst components.

These features of the present invention are realized by reacting a specific organo-zinc-(or boron-) magnesium complex and a specific titanium or vanadium compound and subsequently reacting the resultant hydrocarbon-insoluble solid and a specific organoaluminum compound. In this respect, the hydrocarbon-soluble organo-zinc-(or boron-)magnesium complex is the most essential component. The organo-zinc-magnesium complex is soluble in a hydrocarbon medium and forms a viscous solution, but in the synthesis of the solid component (A), it shows performance different from that of a complex containing an organoaluminum (i.e. a component disclosed in copending application Ser. No. 579,639, filed simultaneously herewith). Since all the organometallic components are included in the solid product, change of catalytic properties due to after-reaction hardly occurs and hence this complex has advantage in handling. Further since it is not liable to be influenced by reaction conditions, it has superiority in the reproducibility of synthesis. On the other hand the organoboron-magnesium complex can be easily synthesized and fluctuation of performance of the catalyst due to the composition of the complex is extremely small. Such stability of performance of catalyst has extremely large benefit in case of commercial scale production.

The above-mentioned features of this invention are more fully described by way of examples and comparative examples given later. Symbols Mw and Mn used therein denote weight average molecular weight and number average molecular weight, respectively, and were measured by gel permeation chromatography (GPC). The ratio of weight average molecular weight to number average molecular weight (Mw/Mn) is a measure of molecular weight distribution; the lower the value of this ratio, the narrower the molecular weight distribution. As is evident from the comparison of Example 1 and Comparative Examples 1, 2 and 3, in case where a solid reaction product is synthesized by using solely an organozinc or an organomagnesium compound or a mixture of these compounds without reaction therebetween, the resultant catalyst is extremely inferior in performance compared with the catalyst of the present invention in which a hydrocarbon-soluble organo-zinc-magnesium is used. With regard to complexes containing alkoxy, aryloxy, siloxy radical or siloxane, the solubility in a hydrocarbon medium is almost equal to the complex which does not contain any of these radicals. With regard to the performance of polymerization if the content of these radicals is increased, activity increases and after passing a point of maximum value it decreases. On the other hand, molecular weight control in the polymerization becomes easier (the production of lower molecular weight polyethylene becomes easier) and the production of polyethylene having a narrower molecular weight distribution becomes possible. Thus the complex containing negative groups such as an alkoxy, aryloxy, siloxy radical or a siloxane are preferred in that a polymer suitable to the production of large-size shaped articles by way of injection molding can be obtained.

Description will be given to the organo-zinc-(or boron-)magnesium complex represented by the general formula $M_\alpha$ $Mg_\beta$ $X_pY_qR^1_rR^2_s$ (wherein M, $R^1$, $R^2$, X, Y, $\alpha$, $\beta$, $p$, $q$, $r$ and $s$ are as above-defined). The hydrocarbon radicals having 1 − 10 carbon atoms, represented by $R^1$ in the above-mentioned formula, are alkyl radicals and include, for example, methyl, ethyl, propyl, butyl, amyl, hexyl, octyl, decyl and the like as preferred radicals. The hydrocarbon radical having 1 − 10 carbon atoms, represented by $R^2$ in the above-mentioned formula, is alkyl or aryl and includes, for example, methyl, ethyl, propyl, butyl, amyl, hexyl, octyl, phenyl and the like as preferred radicals, $R^1$ and $R^2$ can be hydrogen.

Preferably $R^3$ is an alkyl, cycloalkyl or aryl radical for example, methyl, ethyl, propyl, butyl, amyl, hexyl, octyl, decyl, cyclohexyl, phenyl radical or the like. Further $R^4$, $R^5$ and $R^6$ are hydrogen or same or different hydrocarbon radicals having 1 − 10 carbon atoms. Among such hydrocarbons, for example, an alkyl radical such as methyl, ethyl, propyl, butyl, hexyl, octyl or the like, cycloalkyl a radical such as cyclohexyl, methylcyclohexyl or the like, and an aryl radical such as phenyl, naphthyl or the like are preferable. As examples of siloxy radical, there can be mentioned, for example, methyldihydrosiloxy, dimethylhydrosiloxy, trimethylsiloxy, methylethylhydrosiloxy, methyldiethylsiloxy, triethylsiloxy, methylbutylhydrosiloxy, dimethylbutylsiloxy, methylphenylhydrosiloxy, ethylphenylhydrosiloxy, methylethylphenylsiloxy, triphenylsiloxy, α-naphthylphenylmethylsiloxy or the like.

The ratio of magnesium to zinc or boron $\beta/\alpha$ is particularly important to obtain the active solid component of the present invention. In order to synthesize the solid component having active structure, it is necessary that the complex used in the synthesis participates in the reaction effectively under the reaction condition. For that purpose, the existence of the zinc or boron component in an amount suitable to stabilize the dissolved state is important. Both too high values or too low values of $\beta/\alpha$ lower the stability of the complex and in turn, lower the solubility. If the value of $\beta/\alpha$ in the zinc-magnesium complex is lower, the participation of zinc component becomes greater, resulting in reduction of activity. As is evident from Examples 1, 16 − 19 and Comparative Example 4, hereinafter described, the preferred range is 1 − 10 and more preferably 2 − 6.

Further the ratio of $(p + q)/(\alpha + \beta)$ relative to the content of radicals X and Y is also important in attaining the effectiveness of the present invention. As is evident from Examples 20 and 21 and comparative Example 5 hereinafter described, in the range of higher values of $(p + q)/(\alpha + \beta)$, activity is reduced. Accordingly, the preferred range of $(p + q)/(\alpha + \beta)$ is $\leq 0.8$. In order to attain a polymer having a narrow molecular weight distribution, $(p + q)/(\alpha + \beta)$ in the range of 0.30 − 0.80 is preferred. A complex containing no alkoxy, aryloxy or siloxy group can be prepared by reacting an organozinc (or boron) compound represented by the general formula $ZnR^1_2$, $BR^1_3$ or $BR^1_2H$ ($R^1$ is a hydrocarbon) and an organomagnesium compound, represented by the general formula of $MgR^2_2$ or $MgR^2Q$ wherein $R^2$ is a hydrocarbon radical and Q is a halogen. The reaction is performed at a temperature ranging from room temperature to 150° C in an inert hydrocarbon medium such as hexane, heptane, cyclohexane, benzene or toluene. Among alkyl radicals bonded to the boron atom, methyl, ethyl and propyl radicals are particularly preferable from the standpoint of ease of forming the complex. Introducing an alkoxy, aryloxy or siloxy group into the above-mentioned complex is accomplished by reacting the complex and oxygen, an alcohol, silanol, aldehyde, ketone or ester of a carboxylic acid under moderate conditions, or otherwise by the reaction of $ZnR^1_2$ or $BR^1_3$ and $MgX_2$ or $R^2MgX$ or by the reaction of $MgR^2_2$ and $ZnX_2$, $R^1ZnX$, $R^1_2BX$, $R^1BX_2$ or $BX^3$ wherein X has the same meaning as above-mentioned, i.e. is not halogen.

Description will be given to the siloxane compound represented by the general formula

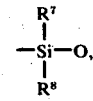

useful in the reaction. The substituents $R^7$ and $R^8$ are hydrogen or the same or different hydrocarbon radicals having 1 to 10 carbon atoms. Among hydrocarbon radicals, for example such radicals as methyl, ethyl, propyl, butyl, hexyl, octyl, cyclohexyl, phenyl or the like are recommended. These compounds can be used in the form of linear or cyclic dimers or a polymer higher than a dimer consisting of one or more than one kind of the constituting units. Illustrative compounds include syn. dihydrotetramethyldisiloxane, hexamethyldisiloxane, pentamethyltrihydrotrisiloxane, cyclic methylhydrotetrasiloxane, polymethylhydrosiloxane whose terminal groups are blocked with methyl groups, polydimethylsiloxane, polyphenylhydrosiloxane whose terminal groups are blocked with methyl groups, polymethylphenylsiloxane or the like.

The reaction of organo-zinc-(or boron-)magnesium complex and siloxane is carried out in an inert reaction medium (e.g. hexane, heptane, benzene and toluene) at a temperature of −20° to 150° C. The reaction ratio as expressed by Si—O/[Mg+Zn(or B)] is in the range of 0.3 − 5, preferably 0.5 − 2. In this reaction the forming of the bond Si—O—M and complex bond

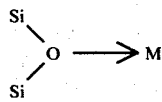

(wherein M is Zn, B or Mg) can be confirmed by infrared spectrum analysis and neuclear magnetic resonance spectroscopy. It is preferable that the ratio of Si—O—M/[Zn(or B)+Mg] in the complex is 0.8 or lower than 0.8 from the standpoint of activity. The above-mentioned complex bond is preferred because it is almost without influence on activity but narrows the molecular weight distribution and lowers the chlorine content of the solid component (A). The structure of the complex is not evident, but, as stated above, it is presumed that there results one or more complexes, consisting of zinc (or boron) and magnesium components. This assumption is based on the fact that $R_2Mg$ is insoluble in inert hydrocarbon solvents whereas the complex is soluble in those media. It is also assumed that there occurs an exchange reaction between the groups attached to the zinc (or boron) and magnesium atoms, respectively.

The titanium or vanadium compound containing at least one halogen atom (catalyst component (iii)) includes titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride, vanadium tetrachloride, vanadyl trichloride, monobutoxyvanadyl dichloride, dibutoxyvanadyl monochloride; titanium and vanadium halides; hydroxyhalides, alkoxy halides; or combinations thereof. Particularly those having 3 or more halogen atoms are preferred.

The reaction method between the organo-zinc-(or boron-) magnesium complex and the titanium or vanadium compound is important to attain the effectiveness of the present invention. It is effected at a temperature up to 100° C, preferably below 20° C in an inert reaction medium, e.g. aliphatic hydrocarbon such as hexane or heptane; aromatic hydrocarbon such as benzene, toluene or xylene; or alicyclic hydrocarbon such as cyclohexane or methylcyclohexane. To insure high activity, it is recommended that the reaction ratio of the two different components of catalyst is 0.05 − 50 mols, especially 0.2 − 5 mols of the organo-zinc-(or boron-) magnesium complex per mol of the titanium or vanadium compound. For the number of moles of organo-zinc-(or boron-) magnesium complex the molar sum of zinc (or boron) and magnesium is used. Taking as an example complex $ZnMg_4$ $(C_2H_5)_2$ $(n-C_4H_9)_8$, 677.7 grams corresponding to the molecular weight based on this structural formula is equivalent to 5 mols. In order to obtain a higher catalyst activity, it is preferable to use a method in which reaction is carried out while both catalyst components are simultaneously added to the reaction zone (i.e. simultaneous addition method). The hydrocarbon-insoluble reaction product may be directly used, provided the reaction is complete, but is desirably separated from the reaction mixture to enhance the reproducibility of polymerization.

A catalyst capable of producing polymers having more uniform particle size and higher bulk density can be prepared by reacting the reaction products thus obtained with halides of aluminum, silicon, tin, titanium, and vanadium.

As the organoaluminum compound (catalyst component B) which is another component of the catalyst of the present invention, a single compound, or a mixture thereof, represented by the general formula $AlR^9{}_nZ_{3-n}$ is used. The hydrocarbon radical $R^9$ having 1 − 20 carbon atoms is an aliphatic, aromatic or alicyclic hydrocarbon. The group Z is hydrogen, a halogen atom, an alkoxy, aryloxy or siloxy group; $n$ is a number in the range of 2 − 3. Recommended compounds include, for example, triethylaluminum, tri-n-propylaluminum, triisopropylaluminum, tri-n-butylaluminum, triisobutylaluminum, tri-hexylaluminum, trioctylaluminum, tridecylaluminum, tridodecylaluminum, trihexadecylaluminum, diethylaluminum halide, diisobutylaluminum halide, diethylaluminum ethoxide, di-isobutylaluminum ethoxide, dioctylaluminum butoxide, di-isobutylaluminum octyloxide, diethylaluminum chloride, di-isobutylaluminum chloride, dimethylhydrosiloxyaluminum dimethyl, ethylmethylhydrosiloxyaluminum diethyl, ethyldimethylsiloxyaluminum diethyl and combinations thereof.

When combined with the hydrocarbon-insoluble solid, said alkylaluminum compound can afford higher activity. To achieve a maximum activity, it is preferable to use specifically trialkylaluminum or dialkylaluminum hydride. When incorporating group X, which is electronegative, into trialkylaluminum or dialkylaluminum hydride, the resultant catalyst tends to decrease in activity but with their characteristic polymerization behavior. Thus it is possible to produce polymers of practical use under high-activity conditions. As an example, introducing alkoxy group makes control of molecular weight easier.

The reaction between components (A) and (B) according to this invention may be conducted by adding both catalytic components to the polymerization system before or after the material to be polymerized. The reaction ratio of the components is preferably 1 − 3,000 m mols of component (B) per gram of component (A).

Polymers having a broad distribution of molecular weight suitable for blow molding, making film or sheet, etc., can be produced by using a catalyst of the present invention which is obtained by reacting components (A) and (B) with a halogenated hydrocarbon. Preferably, the halogenated hydrocarbons have one or more halogen atoms in the molecule, a ratio of halogen/carbon atom of 2 or less, and 2 or more carbon atoms. Examples of halogenated hydrocarbons suitable for use in the present invention are 1,2-dichloro-ethane, 1,2-dichloro-propane, 2,3-dichloro-butane, 1,1,2-trichloro-ethane, 1,2-dibromo-ethane, 1,2-dichloro-hexane, 1,1,2,2-tetrachloro-ethane, etc.

Such effects as extremely high activity and yet a broad distribution of molecular weight are observed only when the hydrocarbon-insoluble solids of the present invention are employed in the polymerization reaction, and are not achieved by the aforementioned prior art methods. The amount of halogenated hydrocarbon to be used is 0.05 to 10 moles, preferably 0.1 to 1 mole, per mole of the component B.

As the polymerization method there are available the usual suspension-, solution-, or gas phase-polymerization. In cases of suspension and solution polymerization processes, the catalyst is let into the reactor with a polymerization medium, e.g. aliphatic hydrocarbon such as hexane or heptane; aromatic hydrocarbon such as benzene, toluene or xylene; or alicyclic hydrocarbon such as cyclohexane or methylcyclohexane. Then, ethylene is added up to 1 – 50 Kg/cm$^2$ under an inert atmosphere and allowed to polymerize at room temperature to 150° C. On the other hand, gas phase polymerization is possible by carrying out the polymerization using a procedure such as fluidized bed, moving bed, mixing with a stirrer, or the like so as to give better contact of ethylene with the catalyst and under an ethylene pressure of 1 – 50 Kg/cm$^2$ and a temperature of from room temperature to 120° C. In order to control the molecular weight of polymer, there may be added hydrogen, or an organometallic compound which is liable to effect chain transfer.

The catalysts of the present invention can be used effectively for polymerizing ethylene in the presence of mono-olefins such as propylene, butene-1, hexene-1, etc. and also for polymerizing propylene.

The following examples illustrate but do not limit this invention. Symbols Mw, Mn and Mw/Mn therein have the same meaning as described above. Catalyst efficiency is expressed as gram(s) of polymer per gram of solid component per hour per Kg/cm$^2$ of ethylene pressure.

EXAMPLE 1

1. Synthesis of the organo-zinc-magnesium complex

In a 500-ml flask were placed 13.80 g of di-n-butylmagnesium and 2.06 g of diethylzinc with 200 ml of n-heptane. The mixture was reacted, with stirring, at 80° C for 2 hours. There was obtained a complex having the composition $ZnMg_6(C_2H_5)_2(n-C_4H_9)_{12}$.

2. Synthesis of the hydrocarbon-insoluble solid component

Oxygen and moisture in the inside of a 500 ml flask equipped with two dropping funnels were evacuated, replaced with dry nitrogen and 160 ml of n-heptane was introduced in this flask and cooled. Then 80 ml of n-heptane solution containing 40 m mols of the above-mentioned complex and 80 ml of n-heptane solution containing 40 m mols of titanium tetrachloride were placed in separate dropping funnels. Both the components were simultaneously added with stirring at −10° C for 2 hours and reaction was continued for 3 hours at this temperature. The resultant hydrocarbon-insoluble solid was isolated, washed with n-heptane and dried to give 10.3 g of solid.

3. Polymerization reaction

In a 5-liter autoclave having been evacuated and replaced with nitrogen, were placed 5 mg of hydrocarbon-insoluble solid and 1.5 m mol of tri-isobutylaluminum plus 3 liters of n-heptane previously dehydrated and degassed. While the inner temperature of the autoclave was kept at 85° C, there were added hydrogen up to 2.0 Kg/cm$^2$ gauge pressure and then ethylene up to 6.0 Kg. total gauge pressure. The polymerization was performed for one hour while additional ethylene was fed to maintain this total gauge pressure. 605 g of polymer was obtained; Mw, 85,000 and Mw/Mn, 8.5. The catalyst efficiency was 30,300.

COMPARATIVE EXAMPLE 1

The synthesis of catalyst and the polymerization were carried out as in Example 1 except that di-n-butylmagnesium was used instead of organo-zinc-magnesium complex and this material was slurried and a TiCl$_4$ solution was added from a dropping funnel. 90 g of polymer was obtained. The catalyst efficiency was 4,500.

COMPARATIVE EXAMPLE 2

The synthesis of catalyst and polymerization were conducted as in Example 1 except that diethylzinc was used instead of organo-zinc-magnesium complex. 15 g of polymer was obtained. The catalyst efficiency was 750.

COMPARATIVE EXAMPLE 3

The polymerization was carried out as in Example 1 except that 5.7 m mols of diethylzinc and 34.3 m mols of di-n-butylmagnesium were used instead of the organo-zinc-magnesium complex and the mixture was slurried and a TiCl$_4$ solution was added from a dropping funnel. 64 g of polymer was obtained. The catalyst efficiency was 3,200.

EXAMPLE 2

In a 200-ml flask was placed a solution containing 50 m mols organo-zinc-magnesium complex having the composition $ZnMg_6(C_2H_5)_2(n-C_4H_9)_{12}$ prepared in Example 1, in 60 ml of heptane. Then, 25 m mols of n-hexylalcohol in heptane was added, with stirring, dropwise at 10° C for 30 minutes. A portion of this solution was sampled and oxidized by dry air, then hydrolyzed to convert alkyl and alkoxy groups into their alcohols. The final product was analyzed by gas chromatography. From the analytical values based on ethanol, n-butanol and n-hexylalcohol, the composition turned out to be $ZnMg_6(On-C_6H_{13})_{3.50}(C_2H_5)_{1.60}(n-C_4H_9)_{8.9}$. In the same manner as in Example 1, 40 m mols of the complex and 40 m mols of titanium tetrachloride were reacted, at −10° C for 4 hours. Using 5 mg. of the resultant hydrocarbon-insoluble solid and 1.5 m mol of tri-isobutylaluminum, the polymerization was performed under the same condition as in Example 1. 590 g of polymer was obtained, Mw, 51,000 and Mw/Mn, 4.6. The catalyst efficiency was 29,500.

EXAMPLES 3 to 9

Using, in combination, the hydrocarbon-insoluble solid prepared by the same method as in Example 1 with the synthesis conditions shown in Table 1, and the organo-aluminum component (Table 1), the polymerization was performed under the same conditions as in Example 1. The results are shown in Table 1. The organo-zinc-magnesium complex used was prepared as in Examples 1 and 2, using diethylzinc, di-n-butylmagnesium, and alcohols or silanol.

TABLE 1

| | Catalyst | | | | | Results of polymerization | | | |
|---|---|---|---|---|---|---|---|---|---|
| | Hydrocarbon-insoluble solid | | | | Organo-aluminum (amount of addition, m mol) | | | | Catalyst efficiency g/g solid. hr. Kg/cm$^2$ ethylene pressure |
| Example | Zn-Mg complex | Ti compound | Molar ratio Zn+Mg/Ti | Temperature(°C) × Time | Amount of addition, mg. | | Yield g | Mw | Mw/Mn | |
| 3 | ZnMg$_4$(C$_2$H$_5$)$_2$(n-C$_4$H$_9$)$_8$ | TiCl$_4$ | 1/1 | −10° C × 4 | 5 | Al(C$_8$H$_{17}$)$_3$ (3.0) | 575 | 78000 | 9.2 | 28800 |
| 4 | ZnMg$_2$(C$_2$H$_5$)$_2$(n-C$_4$H$_9$)$_4$ | Same as above | 1/1 | −10° C × 4 | 5 | Same as above | 560 | 74000 | 9.5 | 28000 |
| 5 | ZnMg$_4$(On-C$_8$H$_{17}$)$_{3.25}$(C$_2$H$_5$)$_{1.40}$(n-C$_4$H$_9$)$_{5.35}$ | Same as above | 2/1 | 0° C × 4 | 5 | Al(C$_6$H$_{13}$)$_3$ (3.0) | 720 | 47000 | 4.1 | 36000 |
| 6 | ZnMg(O—C$_2$H$_5$)$_{0.90}$(C$_2$H$_5$)$_{1.60}$(n-C$_4$H$_9$)$_{3.50}$ | Same as above | 0.8/1 | 0° C × 4 | 5 | Same as above | 540 | 56000 | 5.3 | 27000 |
| 7 | ZnMg$_6$[OSi(CH$_3$)$_3$]$_{4.90}$(C$_2$H$_5$)$_{0.90}$(n-C$_4$H$_9$)$_{8.20}$ | Same as above | 1.5/1 | −20° C × 4 | 5 | Al(i-C$_4$H$_9$)$_3$ (1.5) | 512 | 49000 | 3.8 | 25600 |
| 8 | ZnMg$_4$[OSi·C$_6$H$_5$·(CH$_3$)$_2$]$_{2.50}$(C$_2$H$_5$)$_{1.30}$(n-C$_4$H$_9$)$_{6.20}$ | a 2:1 mol ratio mixture of TiCl$_4$ and VCl$_4$ | 1/1 | −10° C × 4 | 5 | Al(i-C$_4$H$_9$)$_2$H (1.5) | 484 | 56000 | 4.5 | 29200 |
| 9 | ZnMg$_3$(Osi·H·CH$_3$·C$_2$H$_5$)(C$_2$H$_5$)(n-C$_4$H$_9$)$_6$(On-C$_4$H$_9$) | a 2:1 mol ratio mixture of TiCl$_4$ and TiCl$_3$ | 1/1 | 0° C × 4 | 5 | Al(n-C$_8$H$_{17}$)$_3$ (1.5) | 450 | 62000 | 4.2 | 22500 |

EXAMPLE 10

As in Example 1 organo-zinc-magnesium complex of the composition ZnMg$_3$(n-C$_3$H$_7$)$_2$(n-C$_6$H$_{13}$)$_6$ was synthesized from di-n-propyl zinc and di-n-hexyl magnesium. In the same way as in Example 1, 40 m mols of a 1:1 by mole mixture of titanium tetrachloride/monobutoxytitanium trichloride and 40 m mol of the above complex were reacted at 10° C for 4 hours. Using as catalyst 5 mg of the resultant hydrocarbon-insoluble solid plus 3.0 m mols of tridodecylaluminum, the polymerization was carried out as in Example 1. 370 g of polymer was obtained; Mw, 66,000 and Mw/Mn, 8.1. The catalyst efficiency was 18,500.

EXAMPLE 11

As in Example 2, organo-zinc-magnesium complex of the composition ZnMg$_3$(Oi-C$_4$H$_9$)$_{2.0}$(n-C$_3$H$_7$)$_{1.60}$(n-C$_6$H$_{13}$)$_{4.40}$ was made from the organo-zinc-magnesium complex prepared in Example 10 and isobutanol. In the same way as in Example 1, 40 m mols of vanadium tetrachloride and 40 m mols of this complex were reacted at 0° C for 4 hours. Using as catalyst 5 mg of the resulting hydrocarbon-insoluble solid plus 3.0 m mol of tridodecylaluminum, the polymerization was carried out as in Example 1. 495 g of polymer was obtained; Mw, 72,000 and Mw/Mn, 4.5. The catalyst efficiency was 24,800.

EXAMPLE 12

As in Example 1, organo-zinc-magnesium complex of the composition of ZnMg$_5$(n-C$_4$H$_9$)$_{12}$ was made from di-n-butylzinc and di-n-butylmagnesium. In the same manner as in Example 1, 40 m mols of this complex and 40 m mols of vanadyl trichloride were reacted at 0° C for 4 hours. Using as catalyst 5 mg of the resulting hydrocarbon-insoluble solid plus organoaluminum compound of the composition Al(i-C$_4$H$_9$)$_{2.5}$(OC$_2$H$_5$)$_{0.5}$, the polymerization was conducted as in Example 1. 560 g of polymer was obtained; Mw, 95,000 and Mw/Mn, 9.6. The catalyst efficiency was 28,000.

EXAMPLE 13

As in Example 2, organo-zinc-magnesium complex of the composition ZnMg$_5$(On-C$_3$H$_7$)$_{3.0}$(n-C$_4$H$_9$)$_{9.0}$ was made from the organo-zinc-magnesium complex prepared in Example 12 and n-propanol. In the same manner as in Example 1, 40 m mols of a 1:1 by mole mixture of titanium tetrachloride/vanadium tetrachloride and 40 m mols of this complex were reacted at −20° C for 4 hours. Using as catalyst 5 mg of the resulting hydrocarbon-insoluble solid plus organoaluminum compound of the composition Al(i-C$_4$H$_9$)$_{2.5}$Cl$_{0.5}$, the polymerization was performed as in Example 1. 630 g of polymer was obtained; Mw, 49,000 and Mw/Mn, 5.3. The catalyst efficiency was 31,500.

EXAMPLE 14

Using the same catalyst and polymerization conditions as in Example 1 except an ethylene-propylene mixture gas containing 3 percent propylene was employed instead of ethylene, the polymerization was conducted. 720 g of polymer was obtained; Mw, 41,000 and Mw/Mn, 4.6. The catalyst efficiency was 36,000.

EXAMPLE 15

Using the same catalyst and polymerization conditions as in Example 1 except that an ethylene-butene-1 mixture gas containing 4 percent butene-1 was employed instead of ethylene, the polymerization was conducted. 740 g of polymer was obtained; Mw, 35,000 and Mw/Mn 4.2. The catalyst efficiency was 38,000.

EXAMPLES 16 – 22 and COMPARATIVE EXAMPLES 4 – 5

Solid components were prepared using the same catalyst components and conditions as in Example 1, except that organozinc-magnesium complexes given in Table 2 were used. These solid components were then used in polymerization to give the results shown in Table 2.

Table 2

| Examples | Organo-magnesium complexes | Yield g | Mw (×10$^4$) | Mw/Mn | Catalyst efficiency |
|---|---|---|---|---|---|
| 16 | ZnMg$_9$(C$_2$H$_5$)$_2$(n-C$_4$H$_9$)$_{18}$ | 370 | 9.2 | 8.7 | 18500 |
| 17 | ZnMg$_4$(C$_2$H$_5$)$_2$(n-C$_4$H$_9$)$_8$ | 644 | 9.1 | 7.6 | 32200 |
| 18 | ZnMg$_2$(C$_2$H$_5$)$_2$(n-C$_4$H$_9$)$_4$ | 590 | 8.7 | 8.8 | 29500 |
| 19 | ZnMg(C$_2$H$_5$)$_2$(n-C$_4$H$_9$)$_2$ | 436 | 9.3 | 9.1 | 21800 |
| 20 | ZnMg$_4$(On-C$_4$H$_9$)$_{0.75}$ (C$_2$H$_5$)$_{1.75}$(n-C$_4$H$_9$)$_{7.50}$ | 694 | 5.8 | 6.7 | 34700 |
| 21 | ZnMg$_4$(On-C$_4$H$_9$)$_{4.00}$ (C$_2$H$_5$)$_{1.05}$(n-C$_4$H$_9$)$_{4.95}$ | 390 | 5.3 | 3.7 | 19500 |
| 22 | ZnMg$_4$(C$_2$H$_5$)$_2$(C$_{10}$H$_{21}$)$_8$ | 374 | 8.7 | 9.2 | 18700 |
| Comparative Example 4 | Zn$_2$Mg(C$_2$H$_5$)$_4$(n-C$_4$H$_9$)$_2$ | 104 | 9.7 | 9.5 | 5200 |
| Comparative Example 5 | ZnMg$_4$(On-C$_4$H$_9$)$_{5.0}$ (C$_2$H$_5$)$_{0.80}$(n-C$_4$H$_9$)$_{4.20}$ | 170 | 4.9 | 4.2 | 8500 |

EXAMPLES 23 – 26 i. Reactions of organozinc-magnesium complexes with siloxane

A 50 ml solution of heptane containing 1.0 mole/l of an organozinc-magnesium complex prepared as in Example 1 was reacted in a 200-ml flask with a 50 ml solution of heptane containing 0.5 to 2.0 moles/l, based on the Si—O bond, of a siloxane compound.

Those organozinc-magnesium complexes, siloxane compounds, and reaction conditions shown in Table 3 were used in the reaction.

The Si—O—M bond (wherein M is zinc or magnesium) was determined by concentrating the above reaction mixture, and measuring quantitatively the gas emitted when the concentrated mixture was hydrolyzed.

ii. Synthesis of hydrocarbon-insoluble solids

These solids were prepared as in Example 1 under the conditions given in Table 3.

iii. Polymerization

A hydrocarbon-insoluble solid (5 mg) prepared in (ii), above, an aluminum component shown in Table 3, and 800 ml of vacuum-deaerated hexane were charged into a 1.5-liter autoclave which had been vacuum-deaerated and in which air had been replaced by dry nitrogen. The temperature within the autoclave was maintained at 85° C. Hydrogen and ethylene were forced into the autoclave at pressures of 1.0 Kg/cm$^2$ and 3.0 Kg/cm$^2$, respectively, so that the pressures, together with a vapor pressure of hexane, would give a total pressure of 4.7 Kg/cm$^2$ gauge. Polymerization was conducted for an hour while maintaining a total pressure of 4.7 Kg/cm$^2$ gauge by supplying ethylene, to give the results given in Table 3.

Table 3

Catalyst Hydrocarbon-insoluble solids

| | | Reaction of organozinc-magnesium complexes with siloxane compounds | | | | | | | Composition wt% | |
|---|---|---|---|---|---|---|---|---|---|---|
| Examples | Organozinc-magnesium complexes | Siloxane | Si-O/ (Mg+Zn) | Temp. (° C) × Time (hr) | Si-O-M/ Mg+Zn | Ti Compounds | Ti/ Mg+Zn | Temp. (° C) × Time (hr) | Ti | Cl |
| 23 | ZnMg$_6$(C$_2$H$_5$)$_2$ (n-C$_4$H$_9$)$_{12}$ | Hexamethyl-disiloxane | 1/1 | 100° C×5 | 0.12 | TiCl$_4$ | 1/1 | −5° C×4 | 14.2 | 42.6 |
| 24 | ZnMg$_5$(C$_2$H$_5$)$_2$ (C$_6$H$_{13}$)$_4$ | Phenylhydro-polysiloxane 30 centistokes, 30° C | 1/1 | 80° C×5 | 0.54 | TiCl$_4$ | 2/1 | 5° C×4 | 11.6 | 42.1 |
| 25 | ZnMg$_4$(n-C$_4$H$_9$)$_{10}$ | Symmetrical tetramethyl-dihydro-disiloxane | 2/1 | 20° C×1 | 0.78 | TiCl$_4$ | 1/1 | 20° C×4 | 10.5 | 35.6 |
| 26 | ZnMg$_4$(C$_2$H$_5$)$_2$ (n-C$_4$H$_9$)$_8$ | Cyclic methylhydro-tetra- | 1/2 | 10° C×1 | 0.25 | Mixture of TiCl$_4$ and Ti(On-C$_4$H$_9$)Cl$_3$ | 1/1 | −20° C×4 | 14.6 | 44.6 |

Table 3-continued

| siloxane | (2 : 1) | | | |
|---|---|---|---|---|
| | Catalyst | Results of polymerization | | |
| | Organoaluminum compounds (m mol) | Yield g | Catalyst efficiency | Mw ($\times 10^4$) | Mw/Mn |
| | Al(n-$C_6H_{13}$)$_3$ (2.0) | 317 | 21100 | 5.5 | 4.5 |
| | Al(i-$C_4H_9$)$_2$H (0.5) | 243 | 16200 | 5.4 | 3.8 |
| | Al($C_2H_5$)$_2$H (0.5) | 298 | 19900 | 5.8 | 3.2 |
| | Al($C_8H_{17}$)$_3$ (1.0) | 335 | 22300 | 6.2 | 5.8 |

EXAMPLE 27 i. Synthesis of an organoboron-magnesium complex

Di-n-butyl magnesium (13.8 g), 1.63 g of triethylboron, and 200 ml of n-heptane were placed in a 500-ml flask and stirred at 50° C for 2 hours to form a complex of $BMg_6(C_2H_5)_3(n-C_4H_9)_{12}$.

ii. Synthesis of a hydrocarbon-insoluble solid component

Oxygen and moisture were evacuated from a 500-ml flask equipped with two dropping funnels, and were substituted with dry nitrogen. After 160 ml of n-heptane was added, the flask was cooled to $-10°$ C. A solution of 40 m mol, based on magnesium atom, of the complex in 80 ml of n-heptane was placed in one dropping funnel, and a solution of 40 m mols of titanium tetrachloride in 80 ml of n-heptane placed in the other funnel. Both solutions were added dropwise simultaneously over a period of 1 hour, while stirring the mixture at a temperature of $-10°$ C. The mixture was further stirred at this temperature for additional 3 hours. The hydrocarbon-insoluble solid thus formed was isolated, washed with n-heptane and dried to give 9.6 g of the solid.

iii. Polymerization reaction

A hydrocarbon-insoluble solid (5 mg) prepared in (ii), above, 0.4 mmol of triisobutyl aluminum, and 0.8 liter of dehydrated and deaerated n-heptane were charged into a 1.5-liter autoclave which had been vacuum-deaerated and in which air had been replaced by dry nitrogen. The temperature within the autoclave was maintained at 85° C. Hydrogen was forced into the autoclave at a gauge pressure of 1.6 Kg/cm$^2$, and then ethylene was charged so that the total gauge pressure of 4.0 Kg/cm$^2$ would be reached. Polymerization was conducted for an hour while maintaining a total gauge pressure of 4.0 Kg/cm$^2$ by supplying ethylene, thereby obtaining 312 g of a polymer. The polymer had a Mw of 78,000 and a Mw/Mn ratio of 9.2. The catalyst efficiency was 26,000.

EXAMPLE 28

Catalyst synthesis and polymerization were conducted in a similar manner as in Example 27, except that a complex having the composition $BMg_2(C_2H_5)_3(n-C_4H_5)_2$ prepared as in Example 27 was used. This resulted in the formation of 293 g of a polymer, which had a Mw of 75,000 and a Mw/Mn ratio of 9.5. The catalyst efficiency was 24,500.

EXAMPLE 29

A solution of 50 m mols based on the sum of boron and magnesium atoms, of a complex having the composition $BMg_6(C_2H_5)_3(n-C_4H_5)_{12}$ prepared in Example 27 in 60 ml of heptane was placed in a 200-ml flask. To this was added dropwise a solution of 25 m mols of octyl alcohol in 40 ml of heptane with stirring at 10° C over a period of 30 minutes. A part of this solution was taken, oxidized with dry air, then hydrolyzed to convert all the alkyl and alkoxy radicals to alcohol, and analyzed by gas chromatography. The analytical values of ethanol, n-butanol, and n-octanol indicated that the complex had the composition $BMg_6(C_2H_5)_{2.8}(n-C_4H_9)_{8.7}(On-C_8H_{17})_{3.5}$.

The above complex (40 m mols, based on magnesium atom) was reacted with 40 m mols of titanium tetrachloride, as in Example 1, to give a hydrocarbon-insoluble solid. Using 5 mg of the solid and 0.2 m mol of tri-isobutylaluminum, polymerization was conducted under the same conditions as in Example 27, to give 258 g of a polymer. The polymer had a Mw of 47,000 and a Mw/Mn ratio of 3.4. The catalyst efficiency was 21,500.

EXAMPLES 30 – 34

The hydrocarbon-insoluble solids were prepared as in Example 27 under those conditions described in Table 4. Using as catalysts said hydrocarbon-insoluble solids and the organoaluminum components given in Table 4, polymerization was conducted under the same conditions as in Example 27 to give the results shown in Table 4. Those organoboron-magnesium complexes used in the polymerization were prepared as in Examples 27 and 29.

Table 4

| | | Catalyst | | | | Results of polymerization | | | |
|---|---|---|---|---|---|---|---|---|---|
| | | Hydrocarbon-insoluble solids | | | | | | | |
| Examples | B-Mg complexes | Ti,V compounds | Mol ratio of Ti+ V/Mg | Temp. (° C) $\times$ Time (hr) | organo-aluminum compounds (amount used m mol) | Yield g | Mw | Mw/Mn | Catalyst efficiency |
| 30 | $BMg_6(C_2H_5)_3$ $(C_6H_{12})_{16}$ | VCl$_4$ | 1/1 | $-10°$ C $\times$ 4 | Al($C_8H_{17}$)$_3$ (1.6) | 336 | 95000 | 8.7 | 28000 |
| 31 | $BMg(nC_2H_7)_3$ | TiCl$_4$ | 1/1 | $-20°$ C $\times$ 4 | Al($C_6H_{13}$)$_3$ | 282 | 68000 | 6.5 | 23500 |

Table 4-continued

| | Catalyst | | | | | Results of polymerization | | | |
|---|---|---|---|---|---|---|---|---|---|
| | Hydrocarbon-insoluble solids | | | | organo-aluminum compounds (amount used m mol) | | | | |
| Examples | B-Mg complexes | Ti,V compounds | Mol ratio of Ti+V/Mg | Temp. (° C) × Time (hr) | | Yield g | Mw | Mw/Mn | Catalyst efficiency |
| | $(n-C_4H_9)_2$ | $Ti(OnBu)Cl_3$ = 2/1 | | | (1.6) | | | | |
| 32 | $BMg_3(C_2H_5)_3$ $(n-C_3H_7)_{4.5}$ $(OC_2H_5)_{1.5}$ | $TiCl_4$/ $VOCl_3$ = 2/1 | 1/1 | 0° C × 4 | $Al(i-C_4H_9)_2H$ (0.4) | 290 | 54000 | 3.8 | 24200 |
| 33 | $BMg_2(C_2H_5)_3$ $(n-C_4H_9)_{3.0}$ $(OSi[CH_3]_3)_{1.0}$ | $TiCl_4$ | 1/2 | −5° C × 4 | $Al(i-C_4H_9)_{2.5}$ $(OC_2H_5)_{0.5}$ (0.4) | 228 | 57000 | 4.1 | 19000 |
| 34 | $BMg_2(C_2H_5)_3$ $(n-C_4H_9)_{2.5}$ H $(OSiC_4H_9)_{1.5}$ $CH_3$ | $TiCl_4$ | 2/1 | 20° C × 4 | $Al(i-C_4H_9)_{2.5}$ $Cl_{0.5}$ (0.4) | 216 | 51000 | 3.6 | 18000 |

EXAMPLES 35 – 38

Organomagnesium complexes prepared as in Example 27 were reacted with siloxane compounds under those conditions given in Table 5. The reaction products were then reacted with titanium tetrachloride as in Example 27 at a molar ratio of Mg/Ti of 1:1 at 10° C for 4 hours, to give hydrocarbon-insoluble solids. Using 5 mg of these solids and organoaluminum components given in Table 5, polymerization was conducted as in Example 27, except that a hydrogen partial pressure of 1.0 Kg/cm² and an ethylene partial pressure of 3.0 Kg/cm² were used for polymerization, and the results given in the table were obtained. Amounts of Si—O—Mg were determined by quantitative analysis of the gas emitted when the reaction products were hydrolyzed.

Table 5

| | Catalysts | | | | | | Results of polymerization | | | |
|---|---|---|---|---|---|---|---|---|---|---|
| | Reaction products of Organomagnesium complex and siloxane | | | | | | | | | |
| Examples | Organomagnesium complex | Siloxane | Si-O/Mg | Temp. (° C) × Time (hr) | Si-O-Mg/Mg | Organo-aluminum (m mol) | Yield g | Mw | Mw/Mn | Catalyst efficiency |
| 35 | $BMg_6(C_2H_5)_3$ $(n-C_4H_9)_{12}$ | Symmetrical dihydro-tetramethyl disiloxane | 1/1 | 0° C × 1 | 0.15 | $Al(C_2H_5)_2H$ (0.4) | 338 | 61000 | 3.4 | 22500 |
| 36 | $BMg_8(C_2H_5)_3$ $(n-C_4H_9)_{16}$ | Methyl hydropolysiloxane (Viscosity of 30 centistokes at 30° C) | 1/2 | 50° C × 3 | 0.35 | $Al(n-C_3H_7)_3$ (0.4) | 264 | 52000 | 4.2 | 17600 |
| 37 | $BMg_3(C_2H_5)_3$ $(n-C_4H_9)_6$ | Cyclic tetramer of methyl hydrosiloxane | 2/1 | 30° C × 2 | 0.60 | Aluminum isoprenyl (1.6) | 318 | 58000 | 3.9 | 21200 |
| 38 | $BMg_3(C_2H_5)_3$ $(n-C_4H_9)_6$ | Hexamethyl disiloxane | 1/1 | 100° C × 5 | 0.25 | $Al(i-C_4H_9)_3$ (0.4) | 278 | 52000 | 4.0 | 18500 |

EXAMPLE 39

Ethyl-diethoxy-boron was reacted with di-n-butyl-magnesium, as in Example 27, thereby forming a complex having the composition $BMg_4(C_2H_5)$ $(n-C_4H_9)_8(OC_2H_5)_2$. This complex was then reacted with titanium tetrachloride under the same conditions as in Example 27 to give a hydrocarbon-insoluble solid. Using said solid and tri-isobutyl aluminum, polymerization was conducted under the same conditions as in Example 27 to give 252 g of a polymer. The polymer had a Mw of 53,000 and a Mw/Mn ratio of 4.7. The catalyst efficiency was 21,000.

EXAMPLE 40

The solid component (2 g) prepared in Example 1 and 30 ml of n-heptane were placed in a 100-ml flask, and 20 ml of titanium tetrachloride was added. The mixture was reacted at 100° C for an hour. The solid component was isolated and washed with heptane.

Polymerization was conducted as in Example 1, except that 5 mg of said solid was used, thereby obtaining 558 g of a polymer. The polymer had a Mw of 92,000 and a Mw/Mn ratio of 10.8. The catalyst efficiency was 27,900.

EXAMPLE 41

Polymerization was conducted using the same catalyst components and polymerization conditions as in Example 27, except that 0.2 m mol of 1,1-dichloroethane was used as a catalyst component, thereby obtaining 266 g of a polymer. The polymer had a Mw of 106,000 and a Mw/Mn ratio of 17.8. The catalyst efficiency was 22,200.

What is claimed is:

1. A process for polymerizing ethylene or a mixture of ethylene and another olefin which comprises polymerizing ethylene or a mixture of ethylene and another olefin in the presence of a catalyst prepared by reacting (A) a hydrocarbon-insoluble reaction product formed by the reaction of either (i) an organomagnesium-containing hydrocarbon-soluble complex represented by the general formula $M_\alpha$ $Mg_\beta$ $X_pY_qR^1_rR^2_s$ (wherein M is a zinc or boron atom, $R^1$ and $R^2$ are hydrogen or the same or different hydrocarbon radicals each having 1 – 10 carbon atoms, X and Y are the same or different groups $OR^3$ or $OSiR^4R^5R^6$, $R^3$ is a hydrocarbon radical having 1 – 10 carbon atoms, $R^4$, $R^5$ and $R^6$ are hydrogen or the same or different hydrocarbon radicals each having 1 – 10 carbon atoms, $\alpha$ and $\beta$ are each at least one, and $\beta/\alpha$ is 1 – 10, p, q, r, s are each 0 or greater than 0 and have a relation of $p + q + r + s = m\alpha + 2\beta$, and $(p+q)/(\alpha+\beta)$ is $\leq$ 0.8 and m is the valence of M), or of a reaction product of (i) with (ii) a linear or cyclic siloxane compound having a constitutional unit represented by the general formula

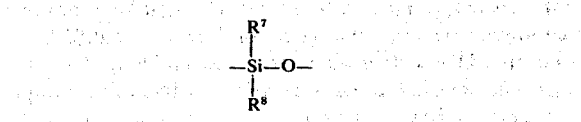

(wherein $R^7$ and $R^8$ are hydrogen or the same or different hydrocarbon radicals each having 1 – 10 carbon atoms), with (iii) at least one titanium or vanadium compound containing 1 – 4 halogen atoms; with (B) an organoaluminum compound having the general formula $AlR^9{}_nZ_{3-n}$ (wherein $R^9$ is a hydrocarbon radical having 1 – 20 carbon atoms, Z is a member selected from the group consisting of hydrogen, halogen, alkoxy, aryloxy and siloxy radicals and n is a number from 2 – 3).

2. A process according to claim 1 wherein said organomagnesium-containing compound has the general formula $M_\alpha$ $Mg_\beta$ $R^1_rR^2_s$ and is reacted with a linear or cyclic siloxane compound containing at least two units of the formula

3. A process according to claim 1 wherein the ratio of $\beta/\alpha$ is in the range of 2 – 6.

4. A process according to claim 1 wherein the ratio of $(p + q)/(\alpha + \beta)$ is in the range of 0.30 – 0.80.

5. A process according to claim 1 wherein said titanium or vanadium compound is titanium tetrachloride, butoxytitanium trichloride, monopropoxytitanium trichloride, monoethoxytitanium trichloride, vanadium tetrachloride, or vanadyl trichloride or a mixture of the foregoing members.

6. A process according to claim 1 wherein the reaction of organomagnesium-containing complex, a siloxane compound and a titanium or vanadium compound is carried out at a temperature lower than 20° C.

7. A process according to claim 1 wherein said organomagnesium-containing complex component and a titanium or vanadium compound component are simultaneously added to the reaction zone in the preparation of hydrocarbon insoluble reaction product.

8. A process according to claim 1 wherein said 0.2 – 5 mols of organomagnesium-containing complex is reacted with one mol of titanium or vanadium compound.

9. A process according to claim 1 wherein said organoaluminum compound represented by the general formula $AlR^9{}_nZ_{3-n}$ is trialkylaluminum or dialkylaluminum hydride.

10. A process according to claim 1 wherein 1 – 3000 m mols of the (B) component is reacted with 1 g of the (A) component.

11. A catalyst for polymerizing ethylene or a mixture of ethylene and another olefin prepared by reacting (A) a hydrocarbon-insoluble reaction product formed by the reaction of either (i) an organomagnesium-containing hydrocarbon-soluble complex represented by the general formula $M_\alpha$ $Mg_\beta$ $X_pY_qR^1_rR^2_s$ (wherein M is a zinc or boron atom, $R^1$ and $R^2$ are hydrogen or the same or different hydrocarbon radicals each having 1 – 10 carbon atoms, X and Y are the same or different groups $OR^3$ or $OSiR^4R^5R^6$, $R^3$ is a hydrocarbon radical having 1 – 10 carbon atoms, $R^4$, $R^5$ and $R^6$ are hydrogen or the same or different hydrocarbon radicals each having 1 – 10 carbon atoms, $\alpha$ and $\beta$ are each at least one, and $\beta/\alpha$ is 1 – 10, p, q, r, s are each 0 or greater than 0 and have a relation of $p + q + r + s = m\alpha + 2\beta$, and $(p+q)/(\alpha+\beta)$ is $\leq$ 0.8 and m is the valence of M), or of a reaction product of (i) with (ii) a linear or cyclic siloxane compound having a constitutional unit represented by the general formula

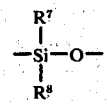

(wherein $R^7$ and $R^8$ are hydrogen or the same or different hydrocarbon radicals each having 1 – 10 carbon atoms), with (iii) at least one titanium or vanadium compound containing 1 – 4 halogen atoms; with (B) an organoaluminum compound having the general formula $AlR^9{}_nZ_{3-n}$ (wherein $R^9$ is a hydrocarbon radical having 1 – 20 carbon atoms, Z is a member selected from the group consisting of hydrogen, halogen, alkoxy, aryloxy and siloxy radicals, and n is a number from 2 – 3).

12. A process for polymerizing ethylene or a mixture of ethylene and another olefin which comprises polymerizing ethylene or a mixture of ethylene and another olefin in the presence of a catalyst prepared by reacting (A) a hydrocarbon-insoluble reaction product formed by the reaction of either (i) an organomagnesium-containing hydrocarbon-soluble complex represented by the general formula $M_\alpha$ $Mg_\beta$ $X_pY_qR^1_rR^2_s$ (wherein M is a zinc or boron atom, $R^1$ and $R^2$ are hydrogen or the same or different hydrocarbon radicals each having 1 – 10 carbon atoms, X and Y are the same or different groups $OR^3$ or $OSiR^4R^5R^6$, $R^3$ is a hydrocarbon radical having 1 – 10 carbon atoms, $R^4$, $R^5$ and $R^6$ are hydrogen or the same or different hydrocarbon radicals each having 1 – 10 carbon atoms, $\alpha$ and $\beta$ are each at least one, and $\beta/\alpha$ is 1 – 10, p, q, r, s are each 0 or greater than 0 and have a relation of $p + q + r + s = m\alpha + 2\beta$, and $(p+q)/(\alpha+\beta)$ is $\leq$ 0.8 and m is the valence of M), or of a reaction product of (i) with (ii) a linear or cyclic siloxane compound having a constitutional unit represented by the general formula

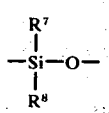

(wherein $R^7$ and $R^8$ are hydrogen or the same or different hydrocarbon radicals each having 1 – 10 carbon atoms), with (iii) at least one titanium or vanadium compound containing 1 – 4 halogen atoms; with (B) an organoaluminum compound having the general formula $AlR^9{}_nZ_{3-n}$ (wherein $R^9$ is a hydrocarbon radical having 1 – 20 carbon atoms, Z is a member selected from the group consisting of hydrogen, halogen, alkoxy, aryloxy and siloxy radicals, and n is a number from 2 – 3), and further adding a halogenated hydrocarbon to the reactant mixture of (A) and (B).

13. A process for polymerizing ethylene or a mixture of ethylene and another olefin which comprises polymerizing ethylene or a mixture of ethylene and another olefin in the presence of a catalyst prepared by reacting (A) a hydrocarbon-insoluble reaction product formed by reacting (i) an organomagnesium-containing hydrocarbon-soluble complex represented by the general formula $M_\alpha \, Mg_\beta \, X_pY_qR^1{}_rR^2{}_s$ (wherein M is a zinc or boron atom, $R^1$ and $R^2$ are hydrogen or the same or different hydrocarbon radicals each having 1 – 10 carbon atoms, X and Y are the same or different groups $OR^3$ or $OSiR^4R^5R^6$, $R^3$ is a hydrocarbon radical having 1 – 10 carbon atoms, $R^4$, $R^5$ and $R^6$ are hydrogen or the same or different hydrocarbon radicals each having 1 – 10 carbon atoms, $\alpha$ and $\beta$ are each at least one, and $\beta/\alpha$ is 1 – 10, $p, q, r, s$ are each 0 or greater than 0 and have a relation of $p + q + r + s = m\alpha + 2\beta$, and $(p+q)/(\alpha+\beta)$ $\leq 0.08$ and $m$ is the valence of M), or the reaction product of (i), with (ii) an aliphatic or cyclic siloxane compound having a constitutional unit represented by the general formula

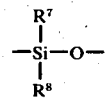

(wherein $R^7$ and $R^8$ are hydrogen or the same or different hydrocarbon radicals each having 1 – 10 carbon atoms), with (iii) at least one titanium or vanadium compound containing 1 – 4 halogen atoms; and further reacting the so obtained solid reaction product with (iv) an aluminum, silicon, tin, titanium or vanadium halogen compound and with (B) an organoaluminum compound having the general formula $AlR^9{}_nZ_{3-n}$ (wherein $R^9$ is a hydrocarbon radical having 1 – 20 carbon atoms, Z is a member selected from the group consisting of hydrogen, halogen, alkoxy, aryloxy and siloxy radicals and n is a number from 2 – 3).

14. A process according to claim 1 wherein said organomagnesium-containing, hydrocarbon-soluble complex has the general formula of $Zn_\alpha \, Mg_\beta \, X_pY_qR^1{}_rR^2{}_s$ wherein $R^1$, $R^2$, $\alpha$, $\beta$, $p$, $q$, $r$ and $s$ are as defined in claim 1.

15. A process according to claim 1 wherein said organomagnesium-containing hydrocarbon-soluble complex has the general formula of $B_\alpha \, Mg_\beta \, X_pY_qR^1{}_rR^2{}_s$ wherein $R^1$, $R^2$, $\alpha$, $\beta$, $p$, $q$, $r$ and $s$ are as defined in claim 1.

* * * * *